United States Patent [19]
Ballard

[11] 3,861,520
[45] Jan. 21, 1975

[54] TRANSFER APPARATUS

[76] Inventor: Robert L. Ballard, 2205 Heather St., S.E., Grand Rapids, Mich. 49506

[22] Filed: Apr. 25, 1973

[21] Appl. No.: 354,213

[52] U.S. Cl. ................ 198/218, 198/19, 214/1 BB
[51] Int. Cl. ........................................ B65g 25/04
[58] Field of Search .......... 198/218, 219, 19; 74/25, 74/27, 36, 45, 48; 214/1 BB

[56] References Cited
UNITED STATES PATENTS

| | | | |
|---|---|---|---|
| 2,756,133 | 7/1956 | Burzin | 74/27 |
| 3,187,883 | 6/1965 | Umbricht | 198/219 |
| 3,521,760 | 7/1970 | Wallis | 198/218 |
| 3,757,961 | 9/1973 | Jacobs | 198/218 |

*Primary Examiner*—Evon C. Blunk
*Assistant Examiner*—Jeffrey V. Nase
*Attorney, Agent, or Firm*—Price, Heneveld, Huizenga & Cooper

[57] ABSTRACT

A transfer apparatus for stepwise transferring an object such as a panel an incremental distance along a processing line includes a pair of spaced transfer rails each including a plurality of gripping members spaced at incremental distances along the length of the rails and yoke drive means for reciprocating the transfer rails through an incremental distance. Additional drive means are provided for simultaneously actuating the gripping members in synchronism with the movement of the transfer rails such that objects such as panels positioned between the transfer rails are alternately gripped, moved forwardly by virtue of the rail movement and released whereupon the transfer rails return to a rearward position in preparation for additional transfer cycles.

14 Claims, 13 Drawing Figures

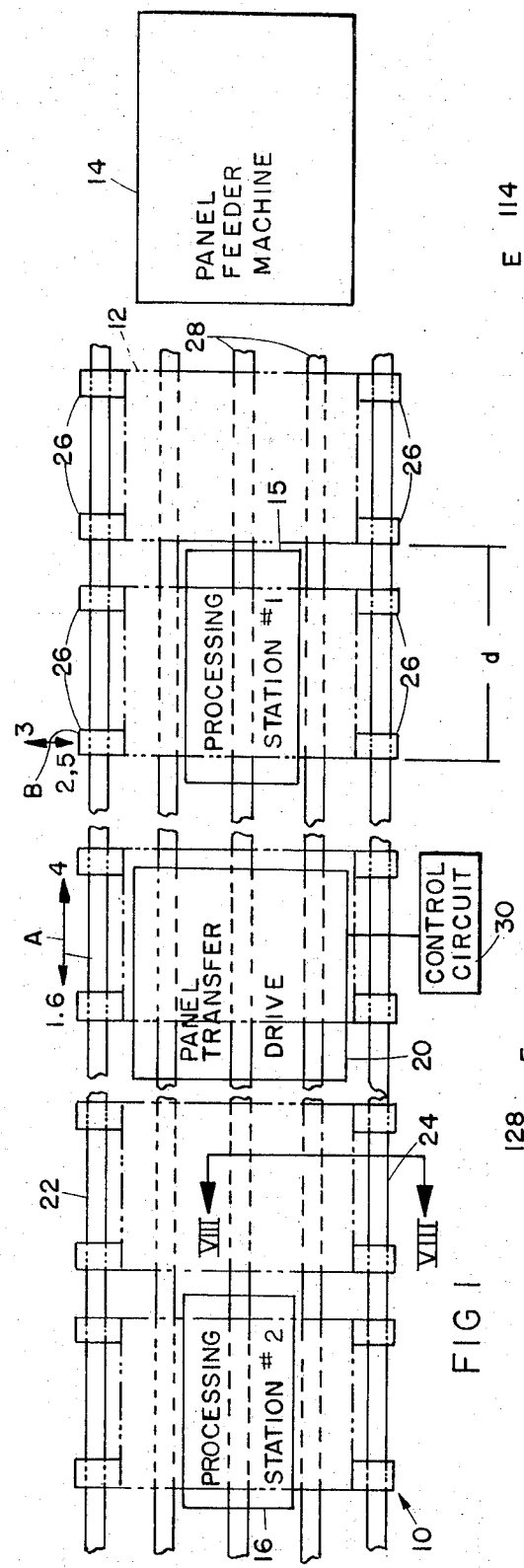
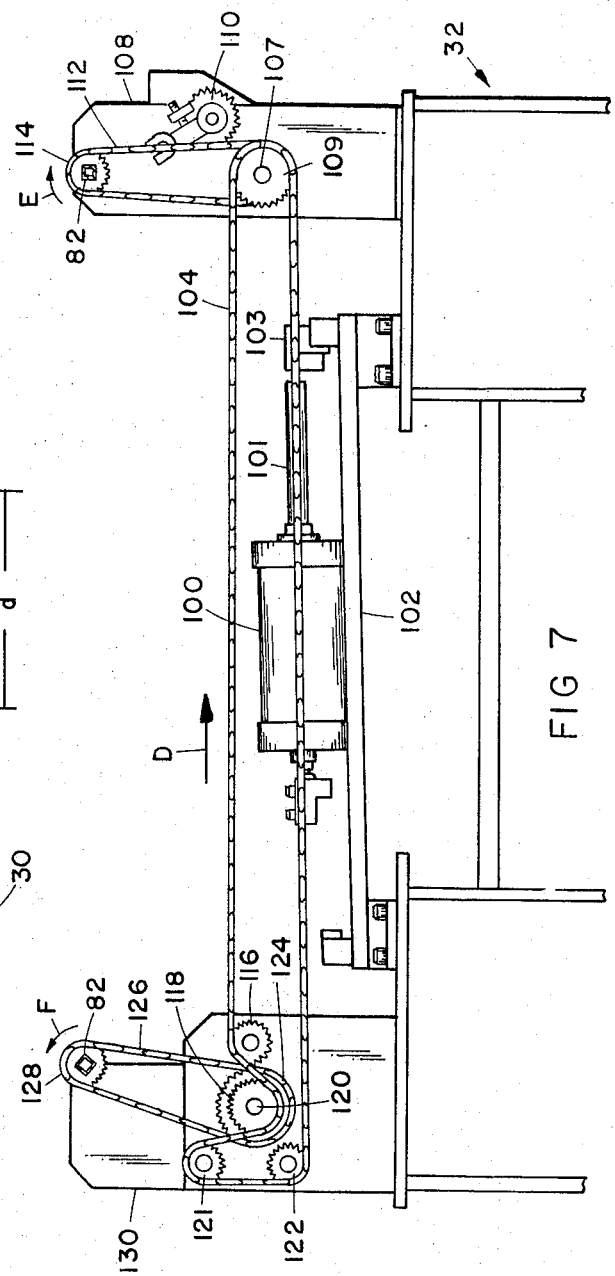
FIG 1
FIG 7

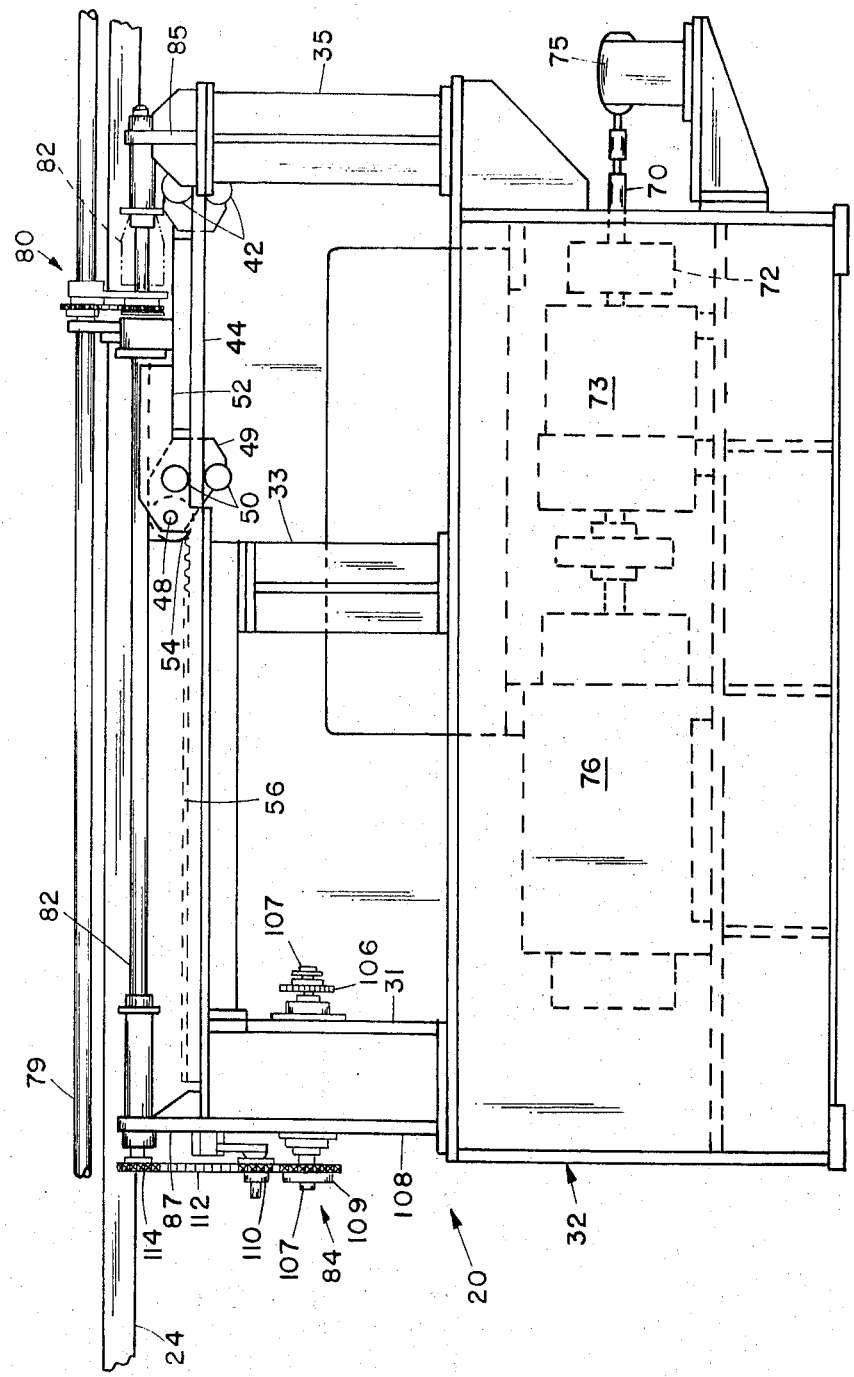

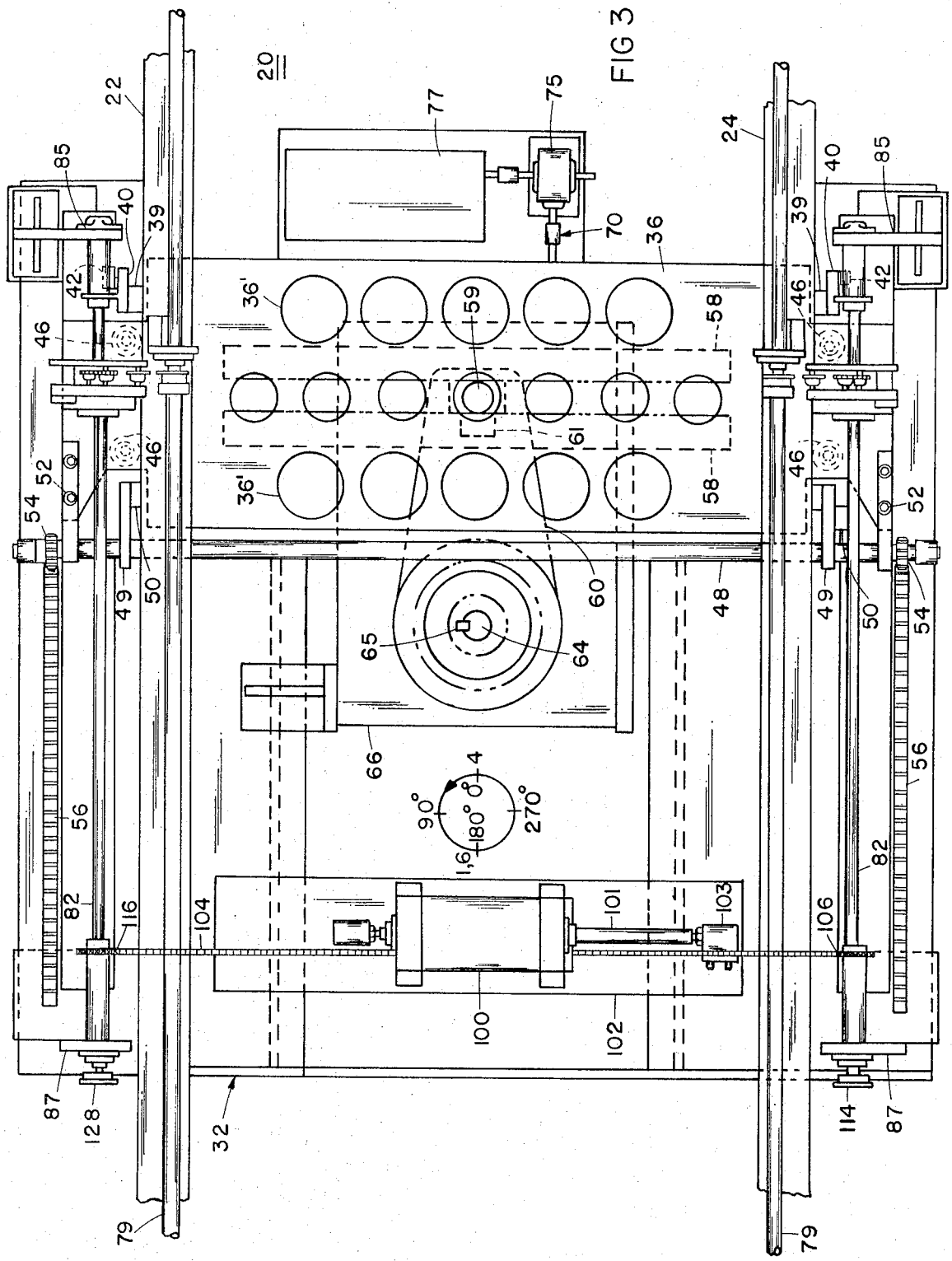

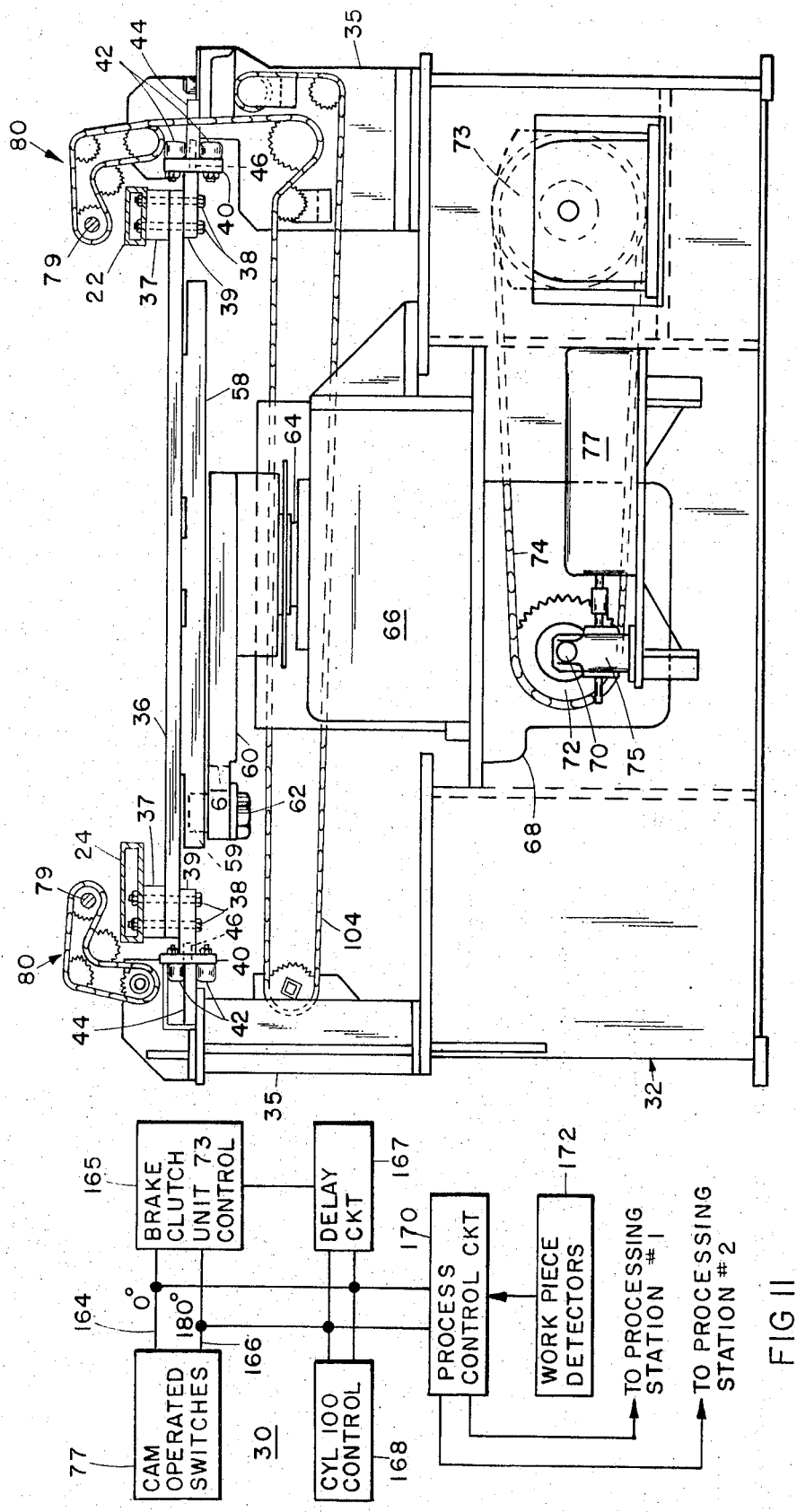

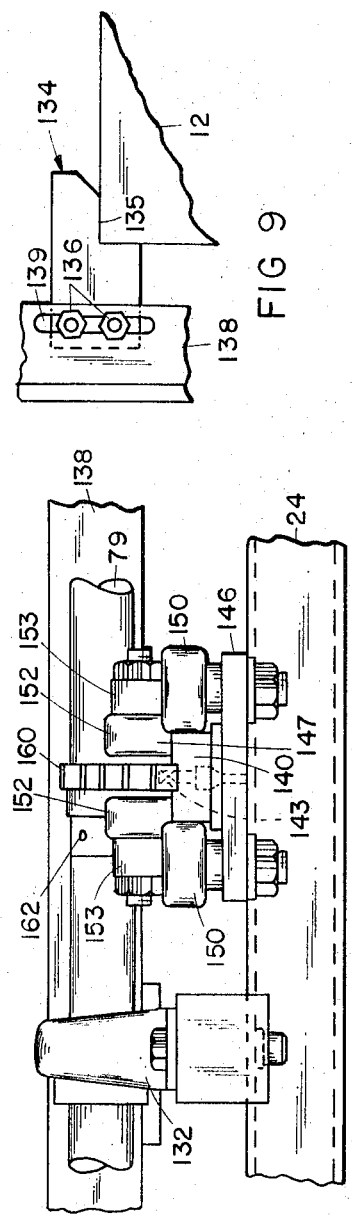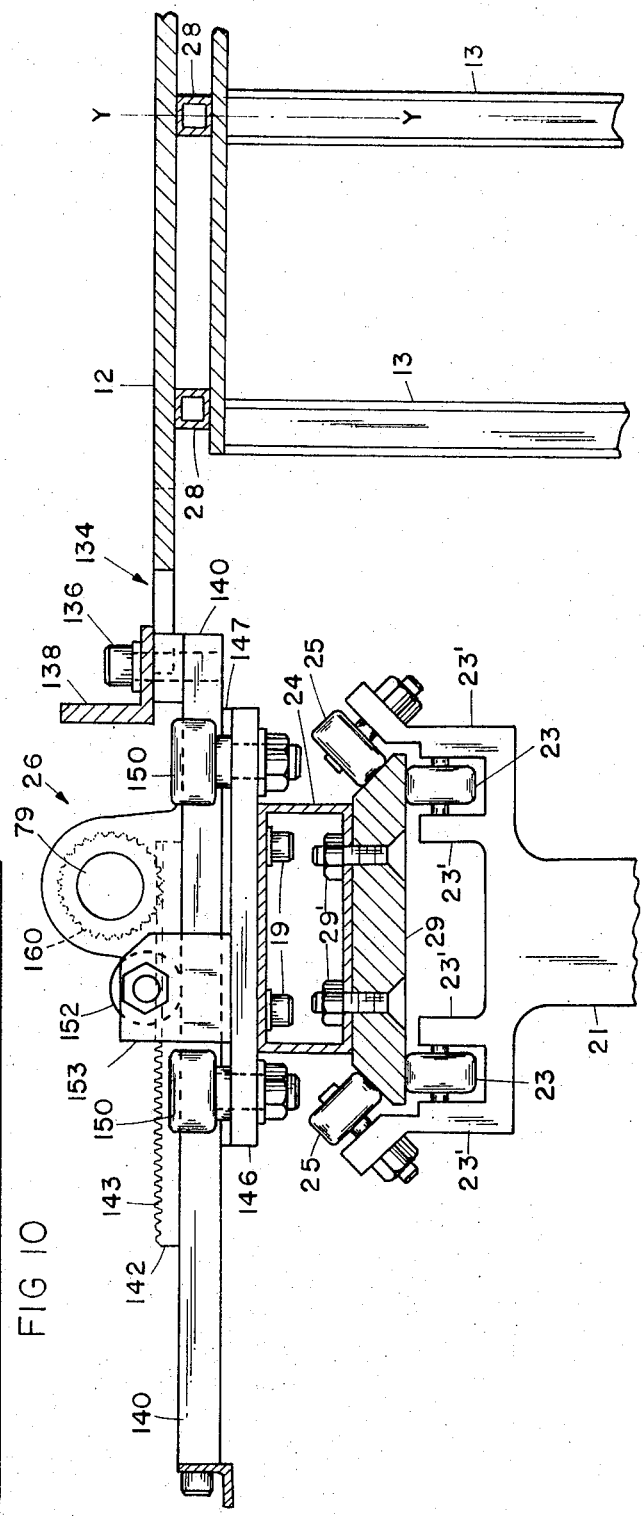

TRANSFER APPARATUS

BACKGROUND OF THE INVENTION

The present invention relates to improved transfer apparatus adapted to stepwise transfer a series of articles along a transfer line.

In many manufacturing operations, it is desired to perform manufacturing or processing steps such as stamping, drilling, etc., on an object which must then be further transferred to a succeeding processing station. In mass production facilities such as manufacturing lines, it is desired to continuously feed a series of objects at regular intervals along a processing line to efficiently utilize the manufacturing apparatus and speed the manufacturing process.

In panel forming manufacturing lines for example, panels have been incrementally moved along the manufacturing line into and out of stamping stations whereupon the panel is formed into the desired shape by a hydraulic press. An additional station spaced downwardly of the manufacturing line may include a drilling station in which several apertures are drilled through the panel at desired locations or other manufacturing processes take place. In existing panel transferring apparatus, the drive means which simultaneously and incrementally shift the position of a series of panels through the various manufacturing stations, have suffered from a lack of speed due in part to the drive mechanism employed to move the support mechanism for the line of panels. It is apparent that, due to the relatively high mass of the support and holding mechanism required to simultaneously transfer several panels, the inertia of the transfer apparatus when in motion severely limits the speed at which the apparatus can operate and effectively stop and reverse directions as necessary in a stepwise transfer apparatus.

In one known installation, the lengthy support members holding gripping fingers for a series of spaced panels were driven by a dual rack and gear arrangement in turn powered by a hydraulic cylinder. In operation, the apparatus tended to severely oscillate at the end of the stroke of the mechanism, partly due to the tremendous inertia and additionally caused by the rapid wear of the gear and rack. This oscillation not only reduced the speed of operation of the machine and caused additional wear of the drive means, it also tended to adversely affect the exact position at which a panel was released. In many processing steps, each successive panel must be very accurately positioned. Thus, prior art devices have proven largely unsuccessful in performing the desired transfer of panels.

Heretofore, there has been no known successful transfer apparatus which could rapidly and simultaneously transfer a plurality of spaced panels in stepwise fashion along a processing line which could extend lengths of 100 feet or more. Thus, there exists a need for improved apparatus which will provide a high speed transfer apparatus while simultaneously eliminating the inertial effects causing oscillation and other undesirable movement of a panel once transferred an incremental distance.

SUMMARY OF THE INVENTION

The present invention solves the existing need for such apparatus by providing a pair of spaced transfer rails guidably supported along their length in slidable fashion and driven by yoke drive mechanism which provides rapid acceleration and deceleration while eliminating the undesirable vibratory motion at the end of travel suffered by existing transfer apparatus. In addition, the present apparatus includes a plurality of article gripping members spaced along the length of each of the transfer rails and unique drive means for simultaneously actuating the gripping members in synchronism with the reciprocal motion of the transfer rails to alternately grip and release objects positioned between the rails to incrementally transfer the objects in one direction along the length of the apparatus.

An object of the present invention, therefore, is to provide improved transfer apparatus for transferring one or more objects in stepwise fashion along a processing line.

Another object of the present invention is to provide a transfer apparatus with improved drive means.

Still a further object of the present invention is to provide a transfer apparatus for transferring a series of spaced panels along a processing line at relatively high speeds.

Another object of the present invention is to provide improved transfer apparatus with a pair of spaced transfer rails reciprocally moved and each including a plurality of spaced gripping members actuated in synchronism with the motion of the transfer rails to transfer a series of panels in stepwise incremental fashion.

These and other objects of the present invention will become apparent upon reading the following description thereof accompanied by the drawings in which:

BRIEF DESCRIPTION OF THE DRAWINGS

FIG. 1 is a plan schematic view of the transfer apparatus as it is used in a manufacturing line;

FIG. 2 is a side elevational view of the drive section of the transfer apparatus embodying the present invention;

FIG. 3 is a plan view of the drive section shown in FIG. 2;

FIG. 4 is a right end view of the apparatus shown in FIG. 3 shown partly in schematic form;

FIG. 7 is a partial left side view of the apparatus shown in FIG. 2;

FIG. 8 is a partial cross-sectional view taken along lines VIII—VIII of FIG. 1 and shows one of the gripping members and drive therefor together with a support member for one of the transfer rails employed with the present apparatus;

FIG. 9 is a fragmentary plan view of one of the gripping fingers employed with the gripping apparatus shown in FIG. 8;

FIG. 10 is a partial left side view of the apparatus shown in FIG. 8; and

FIG. 11 is an electrical circuit diagram in block form of the control circuit for the apparatus.

DETAILED DESCRIPTION OF THE PREFERRED EMBODIMENT

Figure 5:
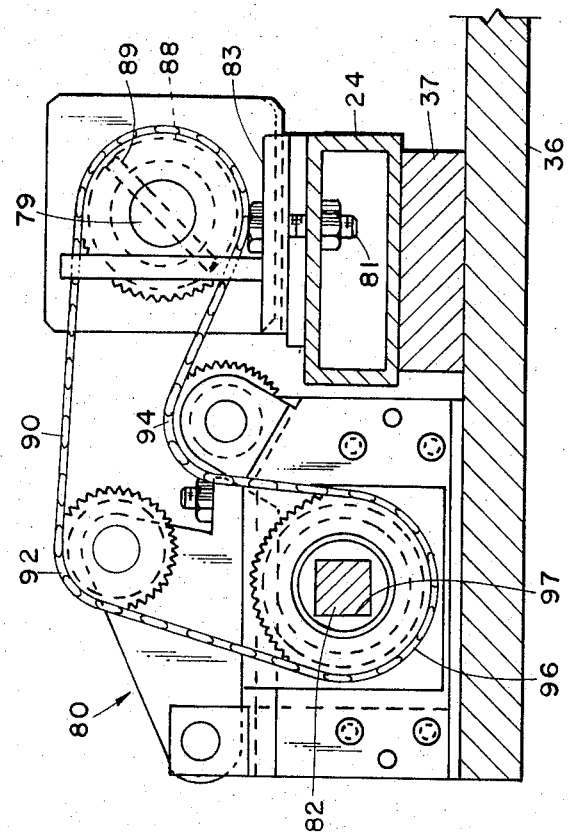
FIG. 5 is an enlarged fragmentary view, partly in cross section, of a portion of the drive apparatus for the gripping members employed with the transfer apparatus of the present invention.

Before discussing the machine construction in detail, a brief discussion of the general operation of the machine in a particular environment is presented with reference to FIG. 1. In FIG. 1 it is seen that the machine is uniquely adaptable for use in an assembly line 10 where, for example, sheet panels 12 are fed from a panel feeding machine 14 through a plurality of processing stations such as those shown at 15 and 16 in the drawings. The panel feeder and destacker machine can be of the type described in my copending application entitled DESTACKING APPARATUS filed on Apr. 23, 1973, Ser. No. 353,245. Although the machine is particularly adapted for transferring panels of sheet material such as steel, it has equal application for panels of other materials or other objects whenever the object is desired to be transferred in a stepwise sequential fashion along a path.

In the embodiment shown in FIG. 1, for example, the first processing station 15 may be a stamping station for partially forming a panel and the second processing station 16 can be a stamping, drilling or other processing station. Only a portion of the line 10 is shown in FIG. 1, it being understood that the line can extend through several additional processing stations intermediate stations 15 and 16 or beyond these stations.

The transfer apparatus consists of a panel transfer drive 20 which preferably is centrally located approximately midway along the manufacturing line 10. Coupled to the transfer drive 20 are a pair of longitudinally extending transfer rails 22 and 24 which are reciprocated by drive 20 forwardly and rearwardly as indicated by arrow A in the figure. Coupled to and spaced at intervals along each of the transfer rails 22 and 24 are a plurality of gripping members 26 which operate in conjunction with a pair of aligned gripping members on the opposite transfer rails to hold panels 12 in position between the transfer rails such that they move along with the motion of the transfer rails. Drive means (not shown in FIG. 1) couple the panel transfer drive unit 20 to each of the gripping members such that they move in a direction indicated by arrow B to alternately grip and release a panel which is supported on stationary support rails 28 extending along the length of the manufacturing line. The stepwise sequential motion of a panel is illustrated by the numerals accompanying arrows A and B where, in the forward position 1, the transfer rails have just moved the panels into an advanced position and at this time, the gripping members are in their inwardly gripping position indicated at 2 in FIG. 1. Next, the gripping members move outwardly (3 in FIG. 1) to release the panels. Subsequently, the transfer rails are reciprocated to a rearward position 4 whereupon the gripping members are again moved inwardly 5 to grip the previously advanced panels whereupon the transfer rails are moved forwardly to position 6 advancing the panels an incremental distance indicated as d in FIG. 1.

The control this sequential operation of the transfer rails and gripping members, a control circuit 30 is employed to provide sequential control signals for the drive mechanism and the processing stations. Having briefly described the overall machine operation and its integral use with a manufacturing line, a detailed description of the unique construction of the machine follows.

To provide the reciprocal motion to the transfer rails 22 and 24 (indicated by arrow A in FIG. 1), there is provided the transfer rail drive mechanism best seen in FIGS. 2–4. To provide the reciprocal inward and outward motion of the gripping members 26 (as indicated by arrow B in FIG. 1), there is provided a gripping member drive mechanism also shown in FIGS. 2–4, but shown in greater detail in FIGS. 5–9.

Initially, it is noted that the transfer rails 22 and 24 are generally rectangular channels of aluminum, as seen in FIG. 8, and are made up of several sections of rectangular channel members suitably interconnected. To provide sliding support for the transfer rails there is provided a fixed vertical stanchion 21, as best seen in FIG. 8, including a generally Y-shaped upper portion having a pair of horizontal support rollers 23 positioned between U-shaped support members comprising vertically extending segments 23'. The upper end of stanchion 21 further includes hold-down rollers 25 mounted to an extension of the outer segments 23' as seen in FIG. 8.

To the bottom of the channel transfer rails there is mounted a beveled plate 29 suitably attached to the bottom surface of the channel by means of bolts 29' such that the tapered corners of the plate 29 are captured between rollers 23 and 25 at opposite edges thereof. Stanchions 21 are spaced as necessary along the entire length of the assembly or manufacturing line and on opposite sides to support both of the transfer rails 22 and 24. Between the transfer rails 22 and 24 the panel supporting members 28 are positioned on a horizontal platform 11 in turn supported by suitable legs 13.

When the panels are moved in the stepwise fashion, briefly discussed above, they are allowed to slide on members 28, which can be provided with suitable spaced rollers if desired, and rest on members 28 during the rearward motion of the transfer rails during which period the processing station is actuated to perform the processing step on the panel. It is noted that the support and transfer rail portion of the transfer apparatus, as shown in FIG. 8, is symmetrical about the Y-axis, shown in FIG. 8, to complete the opposite sides of the mechanism there shown. Having described the general support structure which permits the reciprocal motion of the transfer rails and supports the panels, a detailed description of the transfer rail drive mechanism is now presented with respect to FIGS. 2, 3, 3A, 3B and 4.

As best seen in FIG. 2, the panel transfer drive 20, shown schematically in FIG. 1, comprises a main support frame 32 on which there are mounted superstructure support members 31, 33 and 35. The pair of transfer rails 22 and 24 extend through the transfer drive mechanism 20 and is securely bolted to a reciprocating carriage 36 by means of spacer blocks 37 and suitable bolts 38 as best seen in FIG. 4. Carriage 36, as seen in the plan view of FIG. 3, has a plurality of apertures 36' to reduce its mass and, therefore, the inertial effects as the carriage reciprocates within the transfer drive mechanism 20 to provide the reciprocal motion of transfer rails 22 and 24.

As best seen in FIG. 4, attached to the lower ends of carriage 36 at opposite edges thereof by the bolts 38 is a pair of guide flanges 39 to each of which there is suitably attached a vertical bar 40, each carrying thereon a pair of spaced rollers 42. Rollers 42 span horizontal guide plates 44 in turn secured to the superstructure members 35 at opposite sides of the machine. Rollers 42 are attached to the rear end of the carriage, as best seen in FIGS. 2 and 3. To provide lateral stability at least in part to the carriage 36, a pair of spaced rollers 46 is provided and is mounted to the narrowed extension of carriage 36 on opposite ends of the carriage as best seen in FIG. 3. Rollers 46 engage the vertical edge of plates 44 to provide lateral stability to the carriage as it is reciprocated although additional stability to assure that transfer rails 22 and 24 are simultaneously advanced exactly the same amount is provided by means of a stabilization shaft 48, best seen in FIGS. 2 and 3.

Mounted near opposite ends of stabilizing shaft 48 are brackets 49 which include upper and lower support rollers 50 spanning plates 44 as best seen in FIG. 2. This provides in part the vertical support for shaft 48 which further includes extending end portions coupled to brackets 52 in turn securely bolted to the carriage 36 as seen in FIG. 3. The opposite ends of shaft 48 further include pinion gears 54 which engage racks 56 mounted to the superstructure supports 35 in parallel relationship to one another to assure that as the carriage 36 is reciprocated, the interconnection of the stabilization bar 48 to the carriage via brackets 52 together with the rack and pinion arrangement, assures that opposite ends of the carriage move exactly the same distance and at the same speed preventing skewing of the carriage as it moves to reciprocate the transfer rails. Having described the support and guide mechanisms for the reciprocating carriage 36, a description of the drive mechanism for reciprocating the carriage is presented.

Extending downwardly from the bottom surface of the carriage is a pair of parallel spaced follower bars 58 as best seen in FIGS. 3 and 4. Captured between the follower bars 58 to provide a yoke drive is a drive roller 59 adjustably attached to a crank arm 60 by means of a slotted aperture 61 and bolt 62 in the crank arm. The crank arm in turn is coupled to drive shaft 64 by means of a key and slot arrangement 65 as best seen in FIG. 3. Drive shaft 64 extends downwardly into a drive cam 66 commercially available from the Commerical Cam and Machine Company, series 1200. Cam 66 in turn is coupled to a gear box 68 positioned under the drive cam box 66 and in turn coupled to a drive shaft 70 as seen in FIGS. 2, 3 and 4. Shaft 70 is coupled to a clutch and brake unit 73 (FIG. 2) and a drive motor 76 by means of a timing belt 74 and timing gear 72 on shaft 70. Shaft 70 extends, as best seen in FIG. 3, outwardly to a right angle drive 75 and to a cam switch box 77 which includes a plurality of cam operated switches providing in part the control circuit shown in FIG. 1.

Figure 3B:
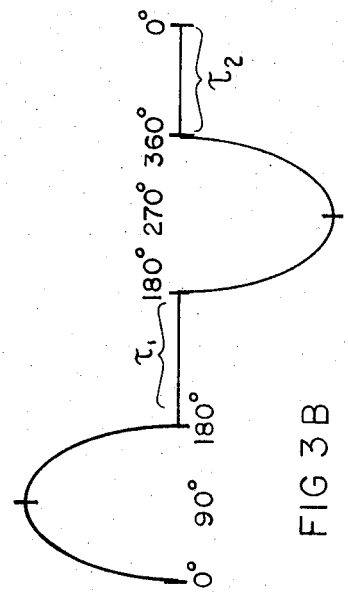
FIG. 3B is a velocity diagram of the transfer rails of the apparatus.
Figure 3A:
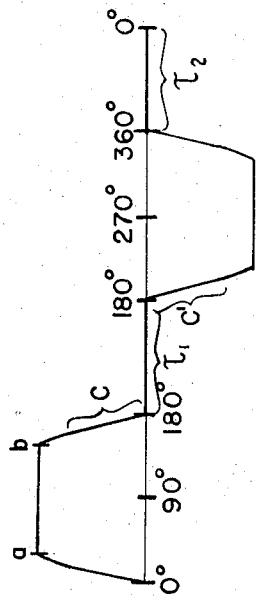
FIG. 3A is a velocity diagram of the drive shaft of the drive means.

The drive arm 60 rotates in a counterclockwise direction, as seen in FIG. 3, and is shown in FIG. 3 in the 0° position (270° position in FIG. 4) as indicated in the accompanying diagram adjacent shaft 64 which corresponds to position 4 of the transfer arms as seen in FIG. 1. The velocity profile of drive shaft 64 is seen in FIG. 3A. Cam drive 66 provides, in response to a constant speed rotary drive, a rapid velocity increase to shaft 64 followed by a constant velocity portion indicated between points $a$ and $b$ in FIG. 3A. During this period ($a$–$b$), the yoke drive arm 60 is passing through the 90° position and the resultant velocity profile of the combined drives to transfer rails 22, 24 is nearly or substantially sinusoidal as seen by the FIG. 3B diagram.

As the crank arm 60 rotates beyond the 90° position, it is rapidly decelerated and comes to a halt at the 180° position corresponding to positions 1 and 6 in FIG. 1. After a predetermined delay $\tau_1$, provided by deactuating the clutch brake unit 73 as described more fully below, the arm continues through its cycle of operation and the carriage reverses direction and rapidly accelerates. Again, shaft 64 has a constant velocity profile between segments $a'$ and $b'$ (FIG. 3A) as the arm swings through the 270° position. Arm 60 then decelerates and stops at its rearward position at the 360° mark followed by a second at rest period $\tau_2$. The combination of drive shaft 64 movement with the yoke drive provides the substantially sinusoidal motion of carriage 36 which eliminates any oscillation of the transfer rails at the end of travel limits. It is noted that the motion of shaft 64 near the 180° position is linear as seen between segments $c$–$c'$ in FIG. 3A. Similarly, it is linear about the 360° area.

At the 180° and 360° positions, the switches in cam box 77 are actuated to decouple the drive motor 76 from the gear box 68 by means of the pneumatically operated clutch brake unit 73 shown in FIG. 2. At these end positions, the clutch brake unit allows sufficient time ($\tau_1$ or $\tau_2$) before continuing the rotation of crank arm 60 to permit the gripping members to be actuated and the desired processing step to be achieved. The throw length ($d$ in FIG. 1) of carriage 36 and, therefore, of the transfer rails 22 and 24 and ultimately the panels, can be selectively adjusted by moving the follower roller 59 radially inwardly along the slotted aperture 61 of crank arm 60. Having described the drive mechanism for the transfer rails, a description of the drive means for the gripping members which are also associated, at least in part, with the centrally located transfer drive mechanism 20 is now presented.

Initially, it is noted by referring to FIG. 8 that each of the gripping members 26 is rigidly attached to the transfer rails 22 and 24 by means of bolts 19. To provide a drive for the gripping members, therefore, a torque shaft 79 (FIGS. 2, 3, 4 and 8) is provided which torque shaft reciprocates together with the carriage 36 and is selectively rotated to cause the gripping members to move inwardly and outwardly to alternately grip and release the workpiece being moved in the stepwise fashion.

It is seen in FIGS. 8 and 10 that the torque shaft 79 is supported along its length by the spaced pillow blocks 132 for receiving the shaft 79 and permitting its rotation. Shaft 79 is coupled to and driven by secondary drive means 80 (FIG. 2) which slides along a longitudinally fixed square drive shaft 82 in turn rotatably driven by primary drive means 84. The square drive shafts 82 are positioned on each side of the mechanism, as seen in FIGS. 3 and 4, for driving the torque rods 79. Although the torque shaft 79 reciprocates together with the reciprocating motion of the transfer rails, the square drive shaft 82 which rotates back and forth through a fixed arc does not, but is stationarily mounted in a rotatable fashion between bearing blocks 85 on the right end of the apparatus, and bearing blocks 86 on the opposite end as best seen in FIGS. 2 and 3. Thus, to accommodate the relative motion between torque shafts 79 and drive shafts 82, the secondary drive means 80 is provided and is shown in detail in FIGS. 5 and 6.

Figure 6:
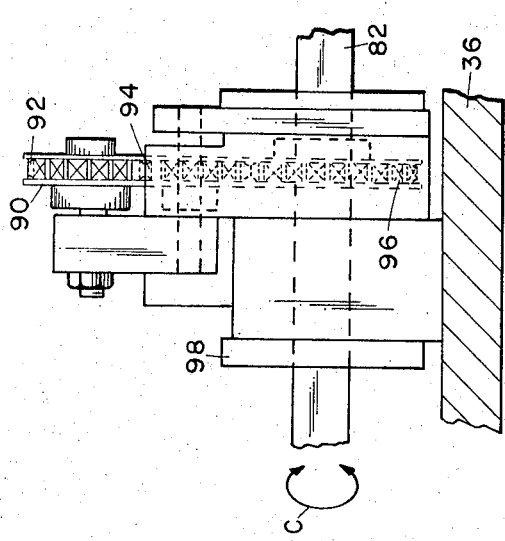
FIG. 6 is a fragmentary left side view of the mechanism shown in FIG. 5.

Drive means 80 are provided for each of the torque shafts 79 and each comprises a first sprocket 88 rigidly attached to torque shaft 79 by means of a pin 89 extending therethrough. Sprocket 88 is rotatably coupled to a support bracket 83 in turn rigidly attached to the transfer rail 22 or 24 by means of bolts 81. A drive chain 90 is strung over sprocket 88 and around guide sprockets 92 and 94 and finally around a drive sprocket 96 slidably coupled to the square shaft 82. A bracket assembly 98 (FIG. 6) provides rotatable coupling of the sprockets to the bracket 98 in a conventional manner and is mounted to the carriage 36 as best seen in FIGS. 5 and 6. Sprocket 96 has a square aperture 97 (FIG. 5) to accommodate the shaft 82 and couple the rotary motion of shaft 82 to cause chain 90 to move around the sprockets and rotate torque shaft 79.

Thus, as the carriage 36, transfer rails 22 and 24, and torque shaft 79 move longitudinally, as indicated by arrow A in FIG. 1, the secondary drive units 80 slide along the square drive shafts 82 by means of the interconnection of sprocket 96 to the shaft. Suitable lubrication is provided along these shafts and a collapsible housing such as a spiral type spring 82', shown in FIG. 2, is provided in opposite sides of drive units 80 to prevent the collection of dirt thereon (one shown in FIG. 2 for purposes of illustration). The secondary drive means, therefore, couple the rotary motion of shaft 82, indicated by arrow C in FIG. 6, from the square drive shafts to the torque shafts 79 such that the torque shafts simultaneously rotate in opposite directions, either toward or away from one another to cause the gripping members to move inwardly or outwardly. Having described the secondary drive means, the primary drive means for rotating the longitudinally fixed drive shafts 82 is now presented in conjunction with FIGS. 2, 3, 4 and 7.

As best seen in FIGS. 3 and 7, the actuation means for the square drive shaft is a pneumatically operated two-way cylinder 100 fixedly positioned on a platform 102 attached on an incline, as seen in FIG. 7, to the base frame 32. Cylinder 100 includes a movable shaft 101 extending therefrom having a coupling 103 at its remote end which is fixedly attached to drive chain 104. Chain 104 extends around a drive sprocket 106 mounted to shaft 107 and extending through a support bracket 108, as best seen in FIG. 2, and including a drive sprocket 109 at the opposite end of shaft 107. A take-up sprocket 110 adjusts the tension of a secondary chain 112 coupled around sprocket 109 and over a drive sprocket 114 rigidly attached to the extending end of drive shaft 82 as best seen in FIG. 2.

Chain 104 extends through a plurality of sprockets on the opposite side of the transfer drive apparatus including guide sprocket 116, reversing drive sprocket 118 mounted on shaft 120, guide sprocket 121 and guide sprocket 122. A take-off sprocket 124 coupled to shaft 120 includes a secondary chain 126 extending to a drive shaft 128 rigidly coupled to the square drive shaft 82 on the opposite side of the machine. As the primary drive chain 104 is moved by cylinder 100 by retracting the shaft 101 therein in a direction indicated by arrow D in FIG. 7, the right drive shaft 82, as seen in FIG. 7, will rotate in a direction indicated by arrow E while the reversing drive shaft 120 will cause sprocket 128 to rotate the left drive shaft 82 in a direction indicated by arrow F. The various drive sprockets shown are conventionally mounted in a rotating fashion to the upright supports 108 and 130, shown in FIG. 7, to provide the desired rotation of the two square drive shafts in opposite directions.

By virtue of the secondary drive means 80, previously described, the torque shafts 79 are likewise simultaneously driven in opposite directions such that the gripping members associated therewith move inwardly to grip a panel or other workpiece or outwardly to release the workpiece and allow the machine transfer rails to retract to receive the next panel.

Having described the actuation of the torque shafts 79 which extend longitudinally the length of the assembly line as do the transfer rails 22 and 24, a detailed description of the gripping members which respond to the rotation of torque shaft 79 to alternately grip and release a workpiece is discussed with reference to FIGS. 8, 9 and 10.

Referring now to these figures, it is seen that as indicated above, the torque shaft 79 is supported on the channels 22 or 24 by means of pillow blocks 132 rigidly bolted to the channels, as seen in FIG. 10, and which permit rotation of the torque shaft while simultaneously providing support for the shaft as it moves together with the gripping members 26. In the preferred embodiment, each of the gripping members includes a finger 134 (FIG. 9) having a notched corner 135 permitting the finger to grip the corner of the panel.

The gripping members 26 are spaced along the transfer rails such that for a given panel width, each of the transfer rails will include a pair of fingers at forward and trailing edges of the panels such that it is securely between four fingers one in each corner. The fingers are in turn attached to a slide 140 by means of bracket 138 and bolts 136. To permit adjustment of the finger spacing, the angle iron bracket 138 includes a notch 139 (FIG. 9) therein permitting the fingers 134 to be slidably adjusted along the bracket to accommodate different sized panels or other workpieces. Slide 140 includes a rack 142 fixedly mounted on the top surface of slide 140 and including teeth 143 projecting upwardly therefrom.

Slide 140 is slidably supported by a mounting plate 146 bolted to the transfer rails as seen in FIGS. 8 and 10. A lubricating plate 147 is sandwiched between the bottom surface of slide 140 and the mounting block 146 to facilitate the relative sliding motion therebetween. To provide lateral and guiding support for the slide, two pairs of spaced horizontally oriented rollers 150 are provided on either side of the slide and engage the vertical outer walls of the slide to maintain the slide in alignment during its motion. Likewise, a pair of holddown rollers 152 are provided and are mounted to a vertical extension 153 of mounting plate 146. Slide 140 is, therefore, captured between the lubricating surface and the various guide rollers provided.

To drive the slide and, therefore, the fingers mounted on the end of the slide, the torque shaft 79 is provided with a pinion gear 160, as best seen in FIGS. 8 and 10, which is aligned and mates with rack 143. Pinion gear 160 is secured to torque shaft 79 by means of suitable set screws 162 or other means to assure the gear will rotate with the rotation of the torque shaft. Although only one of the gripping members comprising the finger and slide arrangement is shown, it is understood that, as seen in FIG. 1, a plurality of gripping members 26 are spaced along each of the transfer rails as required for the desired spacing of the workpieces during their sequential movement along the production line.

OPERATION

Having described the construction of the transfer machine, a brief description of a cycle of operation is presented in conjunction with the block diagram of control circuit 30, seen in FIG. 11, together with referring to FIGS. 1 and 3. As noted earlier, the cam operated switches 77 include at least one switch indicating the zero position of the drive arm 60 for the main drive unit as well as a second cam operated switch indicating the 180° position of the arm as seen by the diagram of FIG. 3. The cam operated switches may include several additional switches and cams adjustable to provide signals at various other intervals of the drive arm as desired for providing auxilliary control functions.

Thus, the control circuit 30 includes the cam operated switch unit 77 having an output 164 for providing a signal at the 0° position of the drive arm and an output 166 providing the 180° signal. Since it is desired to momentarily stop the reciprocation of the transfer rails at their extreme end position, these signals are applied to a brake clutch control unit 165 which develops signals applied to the brake clutch unit 73 which decouple the drive motor 76 from the drive arm at the 0° and 180° positions. The duration of the stationary end position of the transfer rails is selected by a delay circuit 167 which responds to the 0° and 180° signals from unit 77 to reactuate the brake clutch unit after a predetermined and selectable delay time sufficient to allow the gripping members to be actuated and the processing step or steps to be performed on the workpieces. Assuming the transfer arms are in their forward or No. 1 position, as see in FIG. 1, the 180° signal is generated which stops the drive unit and simultaneously actuates the cylinder 100 by means of control circuit 168 to rotate the torque arms 79 to cause the gripping fingers 134 to move outwardly and release the workpiece at the advanced position.

After the run-out period ($\tau_1$) of the delay incorporated in circuit 167 has occurred, the brake clutch unit is again activated to cause the drive arm 60 to continue its counterclockwise rotation to the 0° position 4. At this time, the signal applied from conductor 164 to circuit 165 again decouples the motor from the drive arm and reactuates cylinder 100 such that the gripping fingers (now returned and aligned with the next rearward panel) move inwardly to grip successive panels. After the time delay $\tau_2$, unit 73 is actuated to rotate the drive arm moving the panels forwardly completing the cycle which is continuously repeated to move the series of panels in a stepwise incremental fashion along line 10.

The 0° and 180° signals from unit 77 are also applied to a process control circuit 170 which can provide control signals to the processing stations to initiate the desired process on a panel once it has been advanced into position in the processing station. In this regard, a plurality of detecting units 172 such as photodetectors, limit switches or the like, supply information to the control circuit 170 to assure that the panel is in the desired aligned position before the processing step takes place.

The circuit elements making up the various circuits within control circuit 30 are of conventional design to provide the desired control as indicated. Such circuit elements may include, for example, time delay relays, pulse shaping circuits or other conventional circuits well known in the art. In one installation in which the preferred embodiment was incorporated, the processing line extended for approximately 100 feet while the panel length was 34 inches and the throw of the transfer rails and, therefore, the movement of a panel during each cycle of operation, was approximately 45.5 inches. In this embodiment, a cycle of operation was completed approximately every 2 seconds. Thus, it is seen that the transfer apparatus of the present invention provides the sequential advance of a series of spaced workpieces in a controlled fashion to assure the accurate positioning of the workpiece into and out of processing stations associated with the transfer mechanism.

It will become apparent to those skilled in the art that various modifications to the preferred embodiment can be made without departing from the spirit or scope of the present invention as defined by the appended claims.

The embodiments of the invention in which an exclusive property or privilege is claimed are defined as follows:

1. Apparatus for sequentially transporting a series of spaced workpieces along a path in a stepwise incremental fashion comprising:
   a pair of spaced transfer rails, extending the length of the desired path of movement of a workpiece;
   means including a support frame for slidably supporting said transfer rails;
   carriage means coupling said transfer rails for simultaneous motion;
   carriage support means for supporting said carriage means to permit reciprocation thereof in a path parallel to said transfer rails;
   stabilizing means coupled between said frame and said carriage means to prevent any significant skewing of said carriage means as it reciprocates;
   first drive means coupled to said carriage means and including a yoke for reciprocating said rails between forward and rearward positions in a substantially sinusoidal manner and through a distance selected for the desired incremental motion of the workpiece;
   a plurality of gripping members coupled to and spaced along said transfer rails and movable between article gripping and article releasing positions;
   second drive means for simultaneously actuating said gripping members to grip or release a workpiece;
   means for sequentially actuating said first and second drive means to sequentially grip a workpiece, advance the workpiece, release the workpiece and return said rail to a rearward position before a successive workpiece is gripped; and
   workpiece support means positioned between said transfer rails for supporting a workpiece when released by said gripping members.

2. The apparatus as defined in claim 1 wherein said stabilizing means includes a shaft rotatably coupled to said carriage means and including a pair of spaced gears mounted thereto, and a pair of spaced gear racks positioned on said frame to engage said spaced gears to control the direction of longitudinal motion of said carriage means.

3. The apparatus as defined in claim 1 wherein said transfer rail is coupled to said carriage means and wherein said first drive means includes:
a drive motor having an output shaft;
a clutch coupled to said output shaft; and
a cam drive unit coupled to said clutch and to said yoke, said yoke being further coupled to said carriage means.

4. The apparatus as defined in claim 3 wherein said cam drive unit has a drive shaft extending therefrom and wherein said yoke comprises:
a drive arm having one end coupled to said drive shaft and including a roller at a remote end; and
a pair of substantially parallel spaced follower bars coupled to said carriage means and spanning said roller such that as said drive arm rotates, said yoke reciprocates said carriage means.

5. The apparatus as defined in claim 4 wherein said cam drive unit produces an output motion to said drive shaft comprising a generally sinusoidal motion having substantially flattened peak portions.

6. The apparatus as defined in claim 1 wherein said second drive means comprises:
a torque shaft extending in coupling engagement with said spaced gripping members;
a longitudinally stationary drive shaft;
primary drive means for rotating said longitudinally stationary drive shaft reciprocally through an arc; and
secondary drive means slidably engaging said longitudinally stationary drive shaft and coupled to said torque shaft to transmit rotary motion of said longitudinally stationary drive shaft to said torque shaft.

7. The apparatus as defined in claim 6 wherein said apparatus includes a torque shaft associated with each transfer rail and coupled to associated gripping members.

8. A machine for stepwise transferring panels along a path comprising:
a pair of spaced substantially parallel transfer rails extending along at least a portion of the path;
support means for slidably supporting said rails;
first drive means comprising a carriage coupled to said rails, a drive motor, and a yoke coupling said carriage and said drive motor to simultaneously reciprocate said rails with a substantially sinusoidal velocity;
stabilizing means coupled between said support means and said carriage to prevent any significant skewing of said carriage as it is reciprocated;
a pair of spaced rotatable torque shafts each coupled to one of said transfer rails for motion therewith;
a plurality of gripping members coupled to and spaced along each of said transfer rails and further coupled to said torque shafts to be actuated by the rotation of said torque shaft to grip or release a workpiece positioned between said torque shafts;
second drive means for selectively rotating said torque shafts;
control means for sequentially actuating said first and second drive means to incrementally advance panels along the path; and
workpiece support means positioned between said transfer rails for supporting a workpiece when released by said gripping members.

9. The apparatus as defined in claim 8 wherein said first drive means further includes:
a clutch unit coupled to said drive motor; and
a cam drive unit coupled to said clutch and further coupled to said yoke to provide a drive motion to said yoke which responds thereto to provide the sinusoidal motion of said transfer rails.

10. The apparatus as defined in claim 9 wherein said cam drive unit includes a drive shaft extending therefrom and said yoke comprises:
a drive arm having one end coupled to said drive shaft and including a roller at a remote end; and
a pair of substantially parallel spaced follower bars coupled to said carriage and spanning said roller such that as said drive arm rotates, said yoke reciprocates said carriage.

11. The apparatus as defined in claim 10 wherein said stabilizing means includes a shaft rotatably coupled to said carriage and including a pair of spaced gears mounted thereto, and a pair of spaced gear racks positioned on said support means to engage said spaced gears to control the direction of longitudinal motion of said carriage.

12. The apparatus as defined in claim 11 wherein said second drive means comprises:
a torque shaft extending in coupling engagement with said spaced gripping members;
a longitudinally stationary drive shaft;
primary drive means for rotating said longitudinally stationary drive shaft reciprocally through an arc; and
secondary drive means slidably engaging said longitudinally stationary drive shaft and coupled to said torque shaft to transmit rotary motion of said longitudinally stationary drive shaft to said torque shaft.

13. The apparatus as defined in claim 12 wherein said longitudinally stationary drive shaft has a square cross section and wherein said secondary drive means includes a drive gear slidably mounted to said longitudinally stationary drive shaft.

14. The apparatus as defined in claim 8 wherein said control means includes time delay means for stopping said transfer rails at the ends of travel for a predetermined selectable period of time.

* * * * *